Aug. 26, 1924.

L. V. LEWIS 1,506,012

QUICK RELEASE VALVE

Filed Oct. 13, 1921

INVENTOR
LLOYD V. LEWIS
BY *Wm. M. Cady*
ATTORNEY

Patented Aug. 26, 1924.

1,506,012

UNITED STATES PATENT OFFICE.

LLOYD V. LEWIS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

QUICK-RELEASE VALVE.

Application filed October 13, 1921. Serial No. 507,502.

*To all whom it may concern:*

Be it known that I, LLOYD V. LEWIS, a citizen of the United States, residing at Edgewood, in the county of Allegheny and State of Pennsylvania, have invented new and useful Improvements in Quick-Release Valves, of which the following is a specification.

This invention relates to fluid pressure brakes, and more particularly to a quick release valve device.

The principal object of my invention is to provide an improved quick relase valve device of the type employing a flexible resilient valve disk, as disclosed in the pending application of George S. Lane, Serial No. 404,053, filed August 17, 1920.

While the quick release valve device disclosed in the above patent application accomplishes the desired result satisfactorily, it has been noted that there is liable to be more or less objectionable vibration of the valve disk and noise due to the escape of air.

I have found that this objectionable vibration and noise may be obviated by increasing the thickness or weight of the valve disk over a small area at the central portion of the disk, so that the inertia of the disk is increased, while the flexibility of the disk is retained in order that the valve disk may be responsive to slight differentials of fluid pressure.

Figure 1:
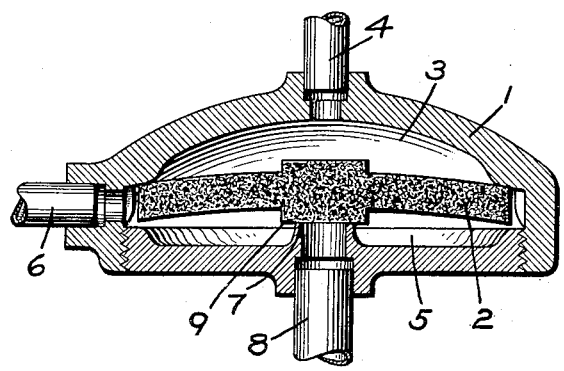
Figure 2:

In the accompanying drawing; Fig. 1 is a central vertical section of a quick release valve device embodying my invention; Fig. 2 a section of a valve disk embodying a slight modification of my invention; and Fig. 3 a diagrammatic view of a fluid pressure brake equipment showing the quick release valve device applied thereto.

As shown in Fig. 1 of the drawing, the quick release valve device may comprise a casing 1, containing a flexible, resilient disk 2. The chamber 3 formed at one side of the disk is connected to a fluid pressure supply and release pipe 4 and the chamber 5 at the opposite side of the disk is connected to a brake cylinder pipe 6.

The central portion of the disk 2 normally engages a seat 7 for controlling communication from chamber 5 to an atmospheric exhaust port 8, and according to my invention, the central portion 9 of the disk is thickened, as shown in the drawing, so as to increase the inertia of the disk to movement and thereby reduce the tendency of the disk to vibrate and also the noise of escaping air.

The disk 2 is normally flexed downwardly toward the periphery, by the under marginal portion of the casing, thus pressing the valve portion 9 of the disk against the seat 7.

Figure 3:
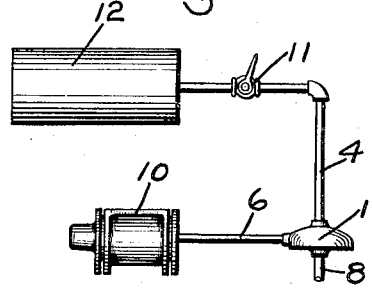

As shown in Fig. 3, the quick release valve device may be applied to a fluid pressure brake equipment comprising a brake cylinder 10 connected to pipe 6, a brake valve device 11 for controlling the supply of fluid from a reservoir 12 to pipe 4 and for releasing fluid from the pipe 4.

In operation, the brakes may be applied by turning the brake valve 11 to a position for supplying fluid under pressure from the reservoir 12 to pipe 4. Fluid supplied through pipe 4 to chamber 3 of the quick release valve device 1, acts on the flexible disk 2 and flexes the same at the periphery, so that communication is opened from chamber 3 to chamber 5 and fluid under pressure is supplied through pipe 6 to the brake cylinder 10, while the portion 9 of the disk is held to its seat 7, preventing the escape of air from chamber 5.

If it is desired to release the brakes, the brake valve 11 is turned to release position, in which fluid is vented from pipe 4 and chamber 3 of the quick release valve device. Upon reducing the pressure in chamber 3, the higher pressure in the brake cylinder 10, acting in chamber 5 will flex the disk 2 centrally so that the portion 9 will be lifted from its seat 7 and fluid under pressure will be allowed to quickly release from the brake cylinder through the exhaust port 8.

In Fig. 2 of the drawing, a slight modification is shown, in which the flexible resilient disk 2' is constructed with a metal insert located at the central portion, such as the metal washer or disk 13, which effects the same result as thickening the disk at its central portion, as shown in Fig. 1.

It will be noted that in the Fig. 1 construction the central portion of the disk is symmetrically thickened on opposite sides of the disk, so as to avoid the possibility of assembling the disk the wrong way.

Having now described my invention, what I claim as new and desire to secure by Letters Patent, is:—

1. A quick release valve device comprising a casing and a flexible resilient disk mounted in said casing and having a centrally arranged seat for controlling a release port and having the central seat portion of the disk weighted to thereby increase the inertia of the disk.

2. A quick release valve device comprising a casing and a flexible resilient disk mounted in said casing for controlling a release port and having the central portion of the disk of greater thickness than the remaining portion of the disk.

3. A quick release valve device comprising a casing and a flexible resilient disk mounted in said casing, the central portion of the disk constituting a valve for controlling a release port and having a thickness greater than the remaining portion of the disk.

4. A quick release valve device comprising a casing and a flexible resilient disk mounted in said casing, the central part of the disk being provided with raised portions on opposite sides of the disk to provide increased mass at the central portion of the disk, one of which portions serve as a valve for controlling a release port.

In testimony whereof I have hereunto set my hand.

LLOYD V. LEWIS.